United States Patent [19]
Yoshida

[11] Patent Number: 4,709,137
[45] Date of Patent: Nov. 24, 1987

[54] IC CARD AND FINANCIAL TRANSACTION PROCESSING SYSTEM USING IC CARD

[75] Inventor: Shinya Yoshida, Kyoto, Japan

[73] Assignee: Omron Tateisi Electronics Co., Kyoto, Japan

[21] Appl. No.: 722,011

[22] Filed: Apr. 11, 1985

[30] Foreign Application Priority Data

| Apr. 16, 1984 | [JP] | Japan | 59-77104 |
| Apr. 18, 1984 | [JP] | Japan | 59-79045 |
| Apr. 18, 1984 | [JP] | Japan | 59-79046 |
| Apr. 25, 1984 | [JP] | Japan | 59-84850 |
| May 4, 1984 | [JP] | Japan | 59-89870 |
| May 9, 1984 | [JP] | Japan | 59-93467 |

[51] Int. Cl.$^4$ .............................................. G06F 15/30
[52] U.S. Cl. ..................................... 235/379; 235/492; 364/408
[58] Field of Search .................. 235/379, 492; 364/408

[56] References Cited

U.S. PATENT DOCUMENTS

| 4,471,216 | 9/1984 | Herve | 235/492 X |
| 4,544,833 | 10/1985 | Ugon | 235/492 X |
| 4,575,621 | 3/1986 | Dreifus | 235/492 X |
| 4,590,365 | 5/1986 | Okada | 235/492 X |
| 4,623,782 | 11/1986 | Faber | 235/379 |

Primary Examiner—David L. Trafton
Attorney, Agent, or Firm—Stevens, Davis, Miller & Mosher

[57] ABSTRACT

An IC card (6) comprises a read only memory (ROM) (2) in which data specifying a financial body and a stored program for processing procedures are stored, a writable and readable random access memory (RAM) (3), and a central processing unit (CPU) (1) for writing or reading out the data and/or program. When, in a transaction processing, a customer inserts his IC card (6) into a terminal (16), the terminal (16) first reads out the financial body specifying data from the ROM 2. If the data as read out is correct, the terminal (16) further generates a signal indicating that the required transaction is possible and provides the signal to the CPU 1 in the IC card, where the stored program for processing procedures is read out from the ROM 2. A transaction is performed in accordance with the read program. If and when no stored program is stored in the ROM 2, the terminal (16) indicates an impossible transaction through a CRT (19) to inform a customer of the fact. The ROM (2) may store a plurality of stored programs for transaction processing procedures, in which case a customer has to select a desired program through an operation of a keyboard (20) in the terminal (16). If and when a version number of the read stored program does not coincide with a version number of the terminal (16), the program is executed after the version number of the read stored program is renewed.

7 Claims, 13 Drawing Figures

IC CARD AND FINANCIAL TRANSACTION PROCESSING SYSTEM USING IC CARD

BACKGROUND OF THE INVENTION

1. Field of the Invention

The present invention relates to an IC (integrated circuit) card and a financial transaction processing system using the IC card, and particularly, relates to an IC card in which data identifying a specific financial institution and a program for transaction processing procedures to be performed in a terminal are stored.

2. Description of the Prior Art

Presently, a magnetic card such as so-called cash card and credit card has been widely used for payment, deposit, transfer and the like through an online system in financial institutions such as a bank and a credit company. Data for identifying a customer, such as a secret number, is magnetically stored in the magnetic card. When a transaction is performed, a customer goes to a bank at which he has a bank account, with such magnetic card, where he inserts his card into a terminal such as an automatic teller machine (ATM) and a cash dispenser (CD) installed therein and enters into the terminal the data necessary for transactions, such as a secret number, a kind of transaction and a transaction amount by operating inputting means, such as a keyboard, in accordance with predetermined procedures. The information of secret number read out by the terminal and the information of each of transactions entered into the terminal by a customer are transmitted to a center of the bank, and in response to the information, a center file is renewed and then an instruction indicating that the transaction is to be performed is provided to the terminal. Thus, any transaction is permitted to be performed between the customer and the terminal.

Recently, many kinds of transactions can be executed by means of an online system and may include transfer transactions, which are not so often used, but which can be expected to be increasingly used. Accordingly, a terminal such as an ATM must include functions and programs which can respond to all kinds of transaction processings, which results in an increase of the load of each of the terminals, in terms of function. In addition, since the presently used magnetic card has only a function identifying a customer, the customer must obey a predetermined transaction processing procedure required by the terminal at the time of performing a transaction, which means that there are increased selecting factors and operating procedures for the customer operating the terminal. Therefore, since it is expected that it may be difficult for a customer to operate a terminal, display means such as a CRT is provided in the terminal as auxiliary means so that the procedure or order of transaction and selecting factors can be displayed to the customer. However, such auxiliary means have some limitatins and, particularly, a customer who is not so familiar with the terminal has difficulty in making transaction operations within a short time-period, resulting in inefficiency of transaction processing.

Under the circumstances, it is desirable that at least one program for transaction processing procedures in a terminal, which has been conventionally stored in the terminal, is stored in a card and it is also desirable for convenience of a customer's operation that, if and when a predetermined program is not stored in a card at the time of performing a transaction, indication of an impossible transaction is provided to a customer.

In addition, it is also desirable that a transaction can be performed only when a transaction processing corresponding to the program stored in the IC card is one of transaction processings which the terminal can execute, and otherwise the transaction processing can not be further continued.

Furthermore, the program for transaction processing procedures is sometimes partly renewed. For example, the data for determining an effective time-period of a card is parly renewed and hence, in general, the program for transaction processing procedures which the terminal can execute must be a newest one.

Accordingly, it is desirable that if and when a version of data of the program stored in the IC card coincides with the version of data of the program which the terminal can execute, the program stored in the IC card is read out and the transaction requested by a customer can be executed based on the read program, and if there is inconsistency, a transaction is discontinued and a customer is informed that the program has not been renewed, or the terminal can rewrite the program stored in the IC card to the newest program the terminal can execute, and thereafter, the transaction can be made in accordance with the rewritten program.

However, a conventional magnetic card has a limitation with respect to storage capacity, that is, there is a problem that only information concerning a single financial body can be stored in a single card and hence the above described various kinds of data can not be stored.

SUMMARY OF THE INVENTION

Briefly stated, the present invention is directed to an integrated circuit card comprising first data storage means including a first storage area for storing data specifying a financial institution and a second storage area for storing at least one program for transaction processing procedures, and means for reading out the storage contents stored in said data storage means.

In accordance with an aspect of the present invention, the present invention is also directed to a financial transaction processing system comprising a integrated circuit card and a terminal for communicating with the integrated circuit card.

The terminal includes means responsive to receipt of the financial institution specifying data read out from the first storage means for determining whether the financial institution specifying data coincides with the data specifying a financial institution to which the terminal belongs and for generating, upon coincidence, a signal indicating that a requested transaction is possible to apply the signal to the reading means of the integrated circuit card. The reading means of the integrated circuit card is responsive to the possible transaction indicating signal for reading out the program for transaction processing procedures from the second storage area to send it to the terminal.

In accordance with another aspect of the present invention, the terminal further includes impossible transaction indicating means for indicating that the transaction requested by a customer is impossible when no program for transaction processing procedures is stored in the second storage area of the integrated circuit card.

In addition, in accordance with a further aspect of the present invention, a plurality of programs for transaction processing procedures are stored in the second storage area and the terminal further includes program designating means for designating a desired program for transaction processing procedures to be executed, from the plurality of programs. In addition, the reading means of the integrated circuit card reads out the program designated by the program designating means from the plurality of programs stored in the second storage area and sends the program as read to the terminal.

In accordance with a still further aspect of the present invention, the first data storage means further includes a third storage area for storing first data specifying the programs for transaction processing procedures and a fourth storage area for storing second data indicating a version of the programs. The terminal further includes second data storage means having a fifth storage area in which a third data specifying at least one program for transaction processing procedures to be able to be executed is stored and a sixth storage area in which fourth data indicating a version of at least one program for transaction processing procedures, and program executing means for executing the program for transaction processing procedures read out by the reading means when the first data read out by the reading means coincides with the third data and the second data read out by the reading means coincides with the fourth data.

In accordance with a still further aspect of the present invention, the second data storage means of the terminal further includes a seventh storage area in which data used for renewing programs from a version indicated by the second data to a version indicated by the fourth data is stored, and the terminal further includes program rewriting means for rewriting the program for transaction processing procedures read out by the reading means to a program having a version indicated by the fourth data, using the data used for renewing program, when the first data read out by the reading means coincides with the third data and the second data read out by the reading means does not coincide with the fourth data. The program executing means executes said rewritten program.

Accordingly, a primary object of the present invention is to provide an integrated circuit card capable of reducing functional loads on a terminal side and also capable of reducing operational loads for a customer.

Another object of the present invention is to provide a financial transaction processing system capable of reducing functional loads on a terminal side and also capable of reducing operational loads when a customer performs a transaction.

A primary advantage of the present invention is that data specifying a financial body and at least one program for transaction processing procedures for operating a terminal in a corresponding financial institution to execute transaction processing can be stored in an IC card.

Another advantage of the present invention is that a customer can perform a transaction processing of a predetermined contents stored in his integrated circuit card even through a use of any terminal, by an IC card storing a desired program for transaction processing procedures, which program is conventionally stored in a terminal and contains predetermined fixed transaction processing procedures, so that efficiency of transaction processing can be improved.

A further advantage of the present invention is that a terminal can includes only a minimum function necessary for transaction processing, by transferring a transaction processing procedure program, which is conventionally stored in a terminal, to an integrated circuit card, and hence the terminal can respond to various kinds of transaction processing.

A further advantage of the present invention is that since the transaction processing procedure program is stored in the IC card, together with the data specifying a financial institution, a transaction can be performed in accordance with the program only when the IC card is entered into a corresponding terminal with which the IC card can communicate. The transaction processing procedure program can not be read out if and when the IC card is entered into another terminal of another financial institution, so that the program can never decoded by another person.

A still further advantage of the present invention is that if and when an integrated circuit card in which a predetermined transaction processing procedure program is not stored is used, a customer can be informed that the transaction requested by the customer is impossible so that the customer can select another or correct transaction processing, without any trouble and hence efficiency for transaction processing can be improved.

In addition, a still further advantage of the present invention is that a plurality of programs for a plurality of transaction processing procedures can be stored in an integrated circuit card and hence a customer can designate a desired program for a transaction processing procedure when he performs transaction processing.

A still further advantage of the present invention is that data specifying programs for transaction processing and data indicating a version of the programs can be stored in an integrated circuit card and a terminal can determine, based on this data, whether the terminal can be operated in accordance with the program which is now stored in the integrated circuit card, and if the program stored in the integrated circuit card has not been renewed, the customer can be informed to that effect and hence the customer can try to perform a transaction after the program is renewed.

A still further advantage of the present invention is that since, if the program stored in the integrated circuit card has not been renewed, the program stored in the integrated circuit card can be rewritten into a newest program by the terminal so that the transaction can be made possible, the integrated circuit card can be still usable for transaction processing even if the program stored in the IC card has not been renewed and in addition, if such card is used, the program stored in the integrated circuit card can be necessarily renewed to the newest one in the terminal and hence the program in the IC card need not be be renewed in advance prior to transaction in other place or other machine.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
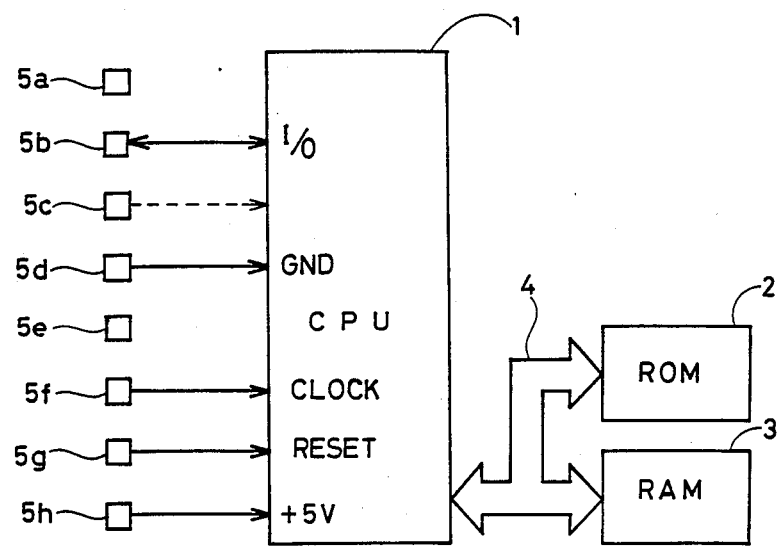
FIG. 1 is a schematic block diagram showing an electrical structure of an integrated circuit card of one embodiment of the present invention.

FIG. 1 is a schematic block diagram showing an electric structure of an integrated circuit card constituting a financial transaction processing system of one embodiment of the present invention.

An integrated circuit card is of the same size and configuration as a conventional magnetic card such as a cash card and a credit card and contains therein at least a memory, such as a read only memory (ROM) and a random access memory (RAM), a central processing unit (CPU) and a plurality of contacts (usually eight contacts) connecting to a terminal. A conventional magnetic card has a small storage capacity and the information stored in the magnetic card can be easily decoded. As compared with such a conventional magnetic card, the feature of the IC card resides in the point that the IC card has a large amount of storage capacity and the program is made in such a manner that it can not be easily read out so that the information stored therein can be prevented from being decoded by others, whereby security is enhanced. In addition, the IC card itself can provide a request to a terminal.

Referring to FIG. 1, the IC card is provided with contacts 5a to 5h for connecting to a terminal. Of these contacts, the contact 5b is used for communicating between the IC card and the terminal. The contacts 5d and 5h are used for supplying a power supply (0V, +5V) from the terminal to the central processing unit 1 of the IC card. The contact 5f is used for supplying clock signals to the central processing unit 1 and the contact 5g is used for supplying a reset signal to the CPU 1. The contact 5c is used for supplying a power for altering the stored contents in the ROM only when the storage contents in the ROM are altered. The remining contacts 5a and 5e are extra contacts. In addition, the CPU 1, ROM 2 and RAM 3 are interconnected through a data bus 4. The CPU controls operation of each constituent element.

Figure 2:
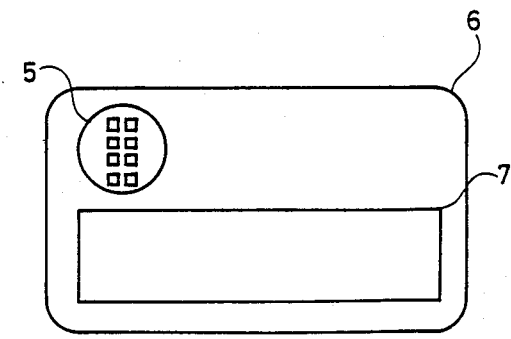
FIG. 2 is a plan view of an integrated circuit card of one embodiment of the present invention.

FIG. 2 is a plan view of an integrated circuit card constituting one embodiment of the present invention. Referring to FIG. 2, a front panel of an integrated circuit card body 6 has a group of contacts 5 (which are comprised of contacts 5a through 5h shown in FIG. 1), which are connected to an integrated circuit card reader provided in a terminal, when the IC card 6 is inserted to the terminal. In addition, the IC card 6 has also an embossed display 7 displaying a name of a card owner, etc.

Figure 3:
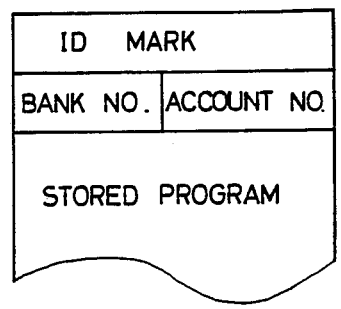
FIG. 3 is a memory map of an integrated circuit card of one embodiment of the present invention.

FIG. 3 is a drawing showing a memory map of a read only memory in the integrated circuit card constituting one embodiment of the present invention. Referring to FIG. 3, the memory map includes an area for storing an identification (ID) mark inherent to a bank at which a customer has an account, an area for storing data specifying a transaction account, such as a bank number and an account number, followed by an area for storing a program for transaction processing procedures.

Figure 4:
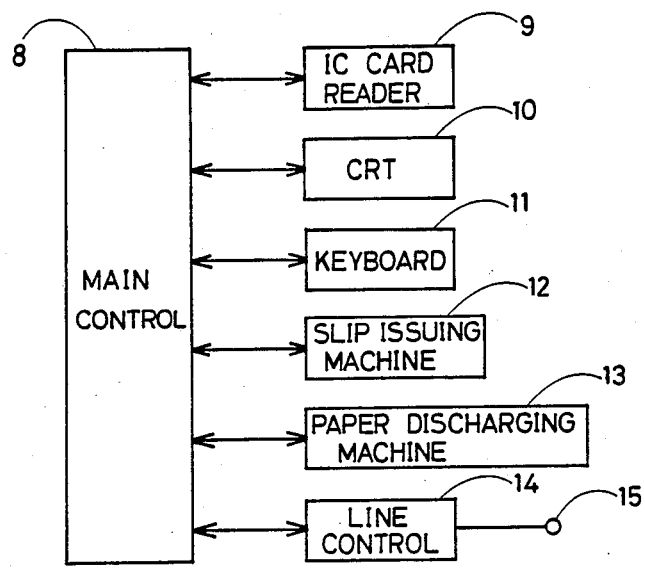
FIG. 4 is a schematic block diagram showing an electric structure of a terminal for use with an integrated circuit card of one embodiment of the present invention.

FIG. 4 is a schematic block diagram showing an electric structure of a terminal communicating with an integrated circuit card constituting an embodiment of the present invention shown in FIGS. 1 to 3. Referring to FIG. 4, an integrated circuit card reader 9 is a unit for communicating with the CPU 1 of the inserted IC card through the contact 5. A CRT 10 is a unit for indicating procedures for transaction to a customer and also for indicating to a customer that the transaction requested by a customer is impossible if a program for transaction processing procedures corresponding to the transaction requested by a customer is not stored in the IC card. A keyboard 11 is a unit used for entering a desired account and a secret number so that a customer can communicate with the terminal. A slip issuing machine 12 is a unit for issuing a slip in response to permission of payment from a center. A paper discharging machine 13 is a unit for discharging a paper to a customer. Each of these units is connected to a main control 8 through internal data buses and the main control 8 controls operation of these units. The main control 8 is connected to a central processing unit (not shown) of a center of a bank through a line control 14 and an input/output terminal 15.

Figure 5:
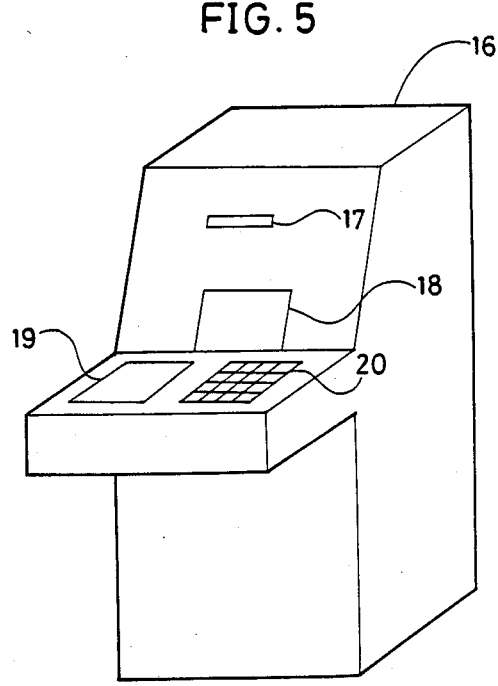
FIG. 5 is a perspective view of a terminal for use with an integrated circuit card shown in FIG. 4.

FIG. 5 is a perspective view of a terminal for an integrated circuit card constituting one embodiment of the present invention. Referring to FIG. 5, a main body 16 of a terminal for use with an integrated circuit card is provided with an IC card inserting opening 17 and a slip/paper discharging opening 18 in a vertical surface thereof and a CRT 19 and a keyboard 20 in a horizontal surface or an operating panel. The IC card inserting opening 17 is for insertion of the IC card when a customer is to perform a transaction, the slip/paper discharging opening 18 is used for presenting to a customer paper and slip upon payment, which is opened only when payment is made. The CRT 19 is used for providing a customer with operational procedure and for indicating an impossible transaction and the keyboard 20 is used for entering a number corresponding to a desired transaction account, a secret number and a claimed amount.

Figure 6:
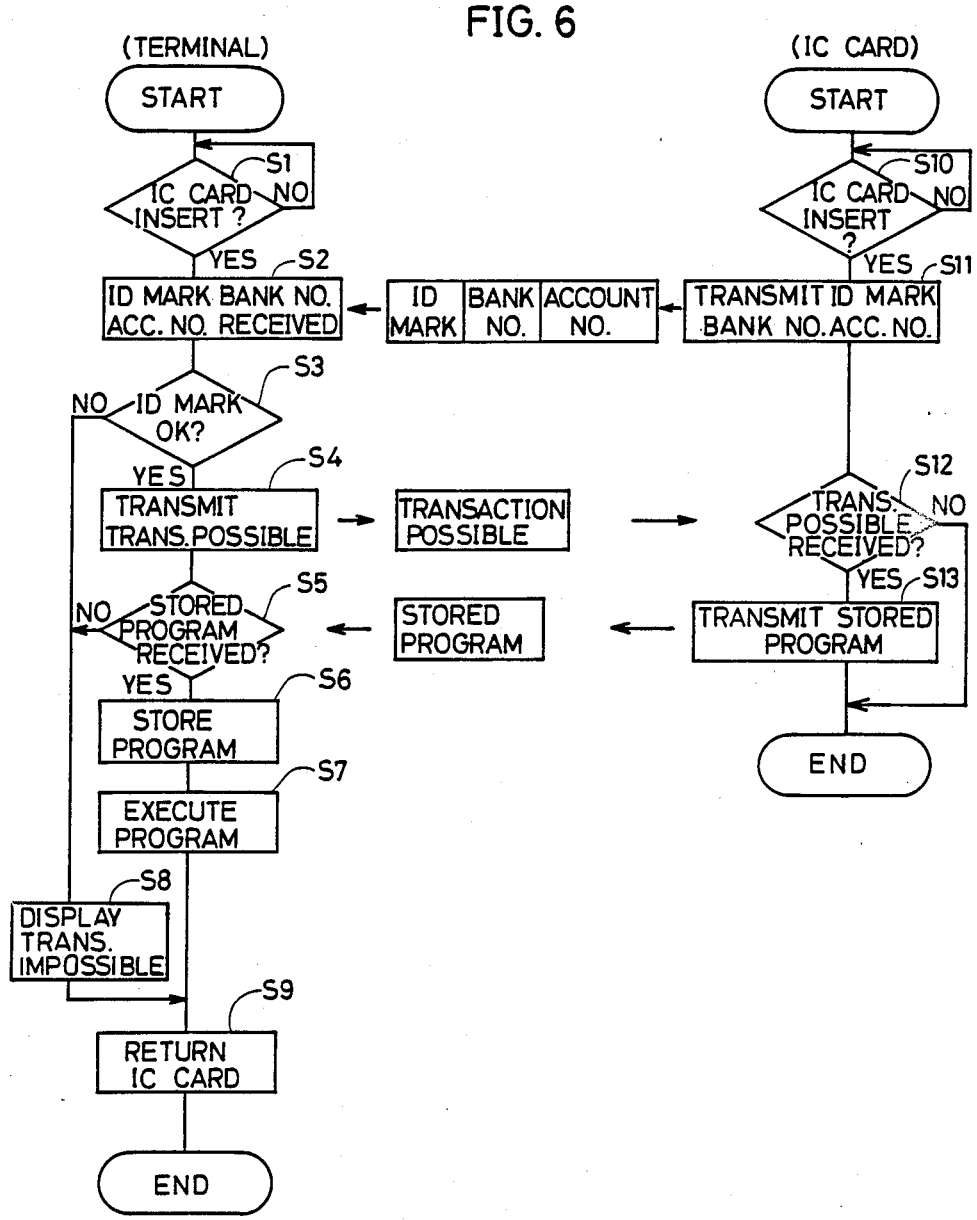
FIG. 6 is a flow diagram explaining an operation of a financial transaction processing system of one embodiment of the present invention.

FIG. 6 is a flow diagram explaining a specific operation of a financial transaction processing system of one embodiment of the present invention.

Referring to FIGS. 1 to 6, a specific operation of one embodiment of the present invention will be described.

First, a customer directly goes to a bank where he wishes to make a transaction processing with an IC card as shown in FIGS. 1 to 3. Then, the customer inserts his IC card into a terminal installed in the bank (Steps S1, S10). Then, an electric power is supplied to all of the elements constituting the IC card shown in FIG. 1.

In the integrated circuit card, the CPU 1 reads out from the ROM 2 the data identifying a financial institution and the data specifying a transaction account, such as an ID mark, a bank number and an account number shown in the memory map of FIG. 3, and sends such data through the contact 5b to an IC card reader 9 of the terminal (Step S11).

On the other hand, in the terminal, the IC card reader 9 receives the data, such as the ID mark, the bank number and the account number, being transmitted from the IC card through the contact 5b (Step S2). The main control 8 determines whether the financial institution specifying data, such as ID mark, as received, coincides with the identifying data inherent to the financial institution to which the terminal belongs (Step S3). As a result, if there is an inconsistency, the main control 8 makes the CRT 19 display to a customer that the card can not be used for a transaction (Step S8) and then the IC card is returned to the customer and the transaction is terminated (Step S9). If there is coincidence with respect to the identifying data, the main control 8 determines that the transaction requested by the customer is possible, so that a massage indicating that a transaction is possible is generated and sent to the IC card (Step S4).

In the IC card receiving such message, the CPU 1 determines whether the possible transaction indicating message is received or not (Step S12). If and when the possible transaction indicating message is not received, the transaction is terminated. If the possible transaction indicating message is received, and a stored program for transaction processing procedures is stored in the ROM 2 as shown in FIG. 3, the stored program is read out and sent to the terminal (Step S13). The integrated circuit card completes its role by sending such message.

Now, in the terminal, the main control 8 determines whether the stored program is received or not (Step S5). As a result, if and when the stored program is not received, that is, if and when the program for processing procedures is not stored in the ROM of the IC card, the main control 8 makes the CRT 19 display the message, "this card is not used for this transaction", so that the customer is informed that the transaction requested by him is impossible (Step S8) and the IC card is returned to the customer so that the transaction is terminated (Step S9). If and when the stored program is received, the terminal temporarily stores the received stored program for transaction processing procedures (Step S6) and subsequently, the terminal can execute transaction processing, such as payment, deposit and transfer, in accordance with such program (Step S7). In addition, if and when execution of the transaction processing is completed, the integrated circuit card is returned to a customer (Step S9), so that all of the transaction processings are terminated.

As described in the foregoing, according to the present embodiment, the program for transaction processing procedures, which is conventionally contained in the terminal, can be stored in an integrated circuit card, so that functional load on the terminal side can be reduced and a customer can perform a transaction based on predetermined contents stored in the IC card at any terminal. In addition, according to the present embodiment, if and when an integrated circuit card in which a predetermined program is not stored is erroneously used, the terminal can indicate to a customer that the transaction requested by the customer is impossible, so that the customer can try again to perform a correct transaction, without any trouble and hence the efficiency of a transaction can be improved.

Figure 7:
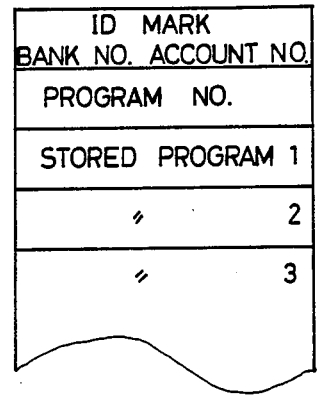
FIG. 7 is a memory map of an integrated circuit card of another embodiment of the present invention.

FIG. 7 is a diagram showing a memory map of the IC card of another embodiment of the present invention. Referring to FIG. 7, the memory map includes a storage area for storing data specifying transaction account such as an identification (ID) mark, a bank number and an account number inherent to a specific bank, a storage area for temporarily storing the number of a program designated by a terminal and a plurality of storage areas for storing a plurality of stored programs for transaction processing procedures.

Figure 8:
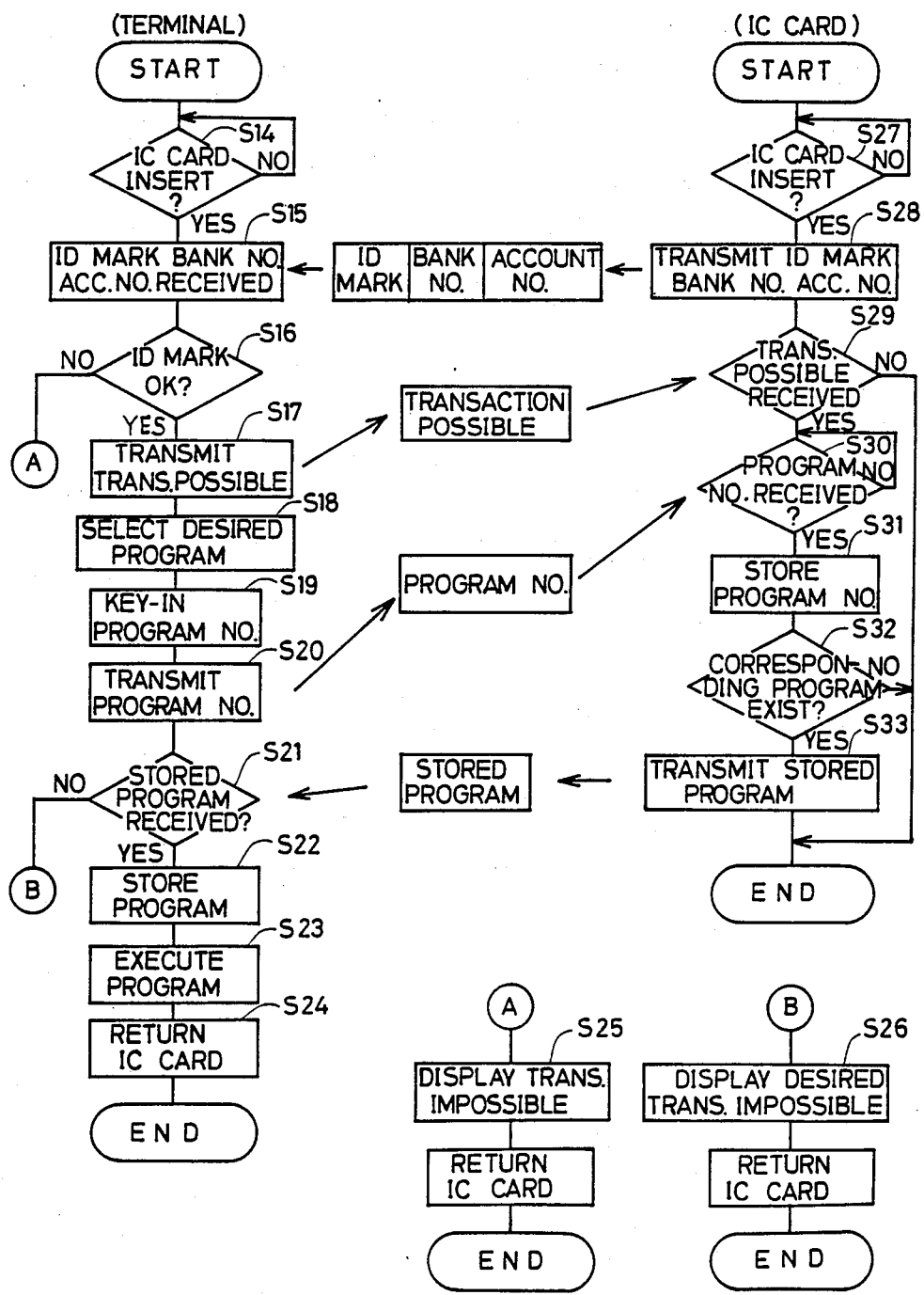
FIG. 8 is a flow diagram explaining an operation of a financial transaction processing system of another embodiment of the present invention.

FIG. 8 is a flow diagram explaining a specific operation of a financial transaction processing system of another embodiment of the present invention, using the integrated circuit card shown in FIG. 7.

Referring to FIG. 8, a specific operation of another embodiment of the present invention will be described.

First, a customer directly goes to a bank where he wishes to perform a transaction with an IC card as shown in FIG. 7. Then, the customer inserts his IC card into a terminal installed in the bank (Steps S14, S27). Then, an electric power is supplied to all of the elements constituting the IC card shown in FIG. 1.

In the integrated circuit card, the CPU 1 reads out from the ROM 2 the data identifying a financial body and the data specifying a transaction account, such as an ID mark, a bank number and an account number shown in the memory map of FIG. 7, and sends such data through the contact 5b to an IC card reader 9 of the terminal (Step S28).

On the other hand, in the terminal, the IC card reader 9 receives the data, such as the ID mark, the bank number and the account number, being transmitted from the IC card through the contact 5b (Step S15). The main control 8 determines whether the financial institution specifying data, such as ID mark, as received, coincides with the identifying data inherent to the financial institution to which the terminal belongs (Step S16). As a result, if there is inconsistency, the main control 8 makes the CRT 19 display to a customer that the card can not be used for a message transaction (Step S25) and then the IC card is returned to the customer and the transaction is terminated. If there is coincidence with respect to the identifying data, the main control 8 determines that the transaction requested by the customer is possible, so that a massage indicating that a transaction is possible is generated and sent to the IC card (Step S17).

In the IC card receiving such message, the CPU 1 determines whether the possible transaction indicating message is received or not (Step S29). If and when the possible transaction indicating message is not received, the transaction is terminated.

In the terminal, the main control 8 makes the CRT 19 display a to the effect that a customer should select and key input a desired program for transaction processing procedures (Step S18). In accordance with such indication in the CRT 19, the customer enters the program number corresponding to the transaction processing procedures which he wishes to take, into the terminal by using a keyboard 20 (Step S19). The entered program number is transmitted to the CPU 1 of the IC card through the contact 5b (Step S20).

Then, in the IC card, the CPU 1 determines whether the program number is received or not (Step S30), and if so, the received program number is temporarily stored in the storage area shown in FIG. 7 (Step S31) and the CPU 1 determines whether the stored program corresponding to the temporarily stored program number exist in the storage areas in the ROM 2 (Step S32). If the corresponding program does not exist in the ROM 2, the transaction is terminated and if the corresponding program exist, the CPU 1 reads out the corresponding stored program and sends the program to the terminal (Step S33). The integrated circuit card completes its role by sending this message.

Then, in the terminal, the main control 8 determines whether the corresponding stored program is received or not (Step S21). As a result, if the corresponding stored program is not received, the main control 8 makes the CRT 19 display a message indicating that this card can not be used for the particular transaction processing requested by the customer although the card itself is correct, so that the customer can be informed of the impossibility of executing the transaction (Step S26) and the IC card is returned to the customer and then the transaction is terminated. If and when the corresponding stored program is received, the terminal temporarily stores the stored program as received (Step S22) and subsequently, the terminal can execute transaction processing such as payment, deposit and transfer, in accordance with the stored program (Step S23).

In addition, if and when execution of transaction processing is completed, the IC card is returned to the customer (Step S24), so that all of the transaction processings are completed.

As described in the foregoing, in accordance with the embodiment of the present invention, a desired transaction can be selected and executed, from a plurality of programs for transaction processing procedures stored in the IC card.

Figure 9:
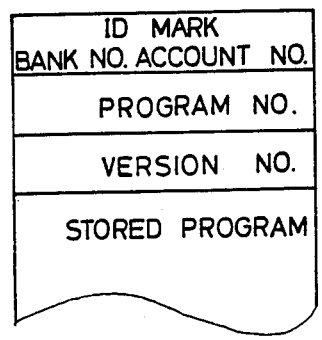
FIG. 9 is a memory map of an integrated circuit card of another embodiment of the present invention.

FIG. 9 is a drawing showing a memory map of a read only memory of an integrated circuit card constituting another embodiment of the present invention. Referring to FIG. 9, the memory map includes a storage area for storing data specifying a transaction account such as an identification mark, a bank number and an account number inherent to a specific bank, a storage area for storing a program number of a stored program for a transaction processing procedure, a storage area for storing a version number of a stored program, and a storage area for storing a stored program or programs.

Figure 10:
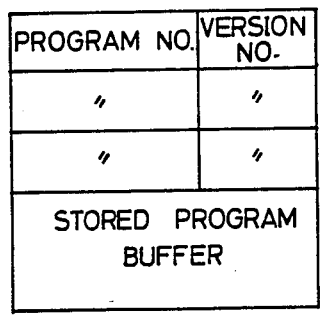
FIG. 10 is a memory map of a terminal for use with an integrated circuit card of another embodiment of the present invention.

FIG. 10 is a drawing showing a memory map of storage means provided in a terminal for use with an integrated circuit card, containing the data shown in FIG. 9. Referring to FIG. 10, the memory map includes a plurality of storage areas for storing program numbers of stored programs for a plurality of transaction processing procedures which the terminal can execute (the terminal can not execute any program other than these programs corresponding to these program numbers), and a corresponding plurality of storage areas for storing version numbers corresponding to the above described program numbers. Generally, these version numbers are the newest ones. Accordingly, even if the program number received from the IC card corresponds to the program number which the terminal can execute, the execution of the program is impossible unless the version number corresponding to the program number coincides with the version number received from the IC card. In addition, there is provided a stored program buffer which temporarily stores a stored program read out from the IC card.

Figure 11:
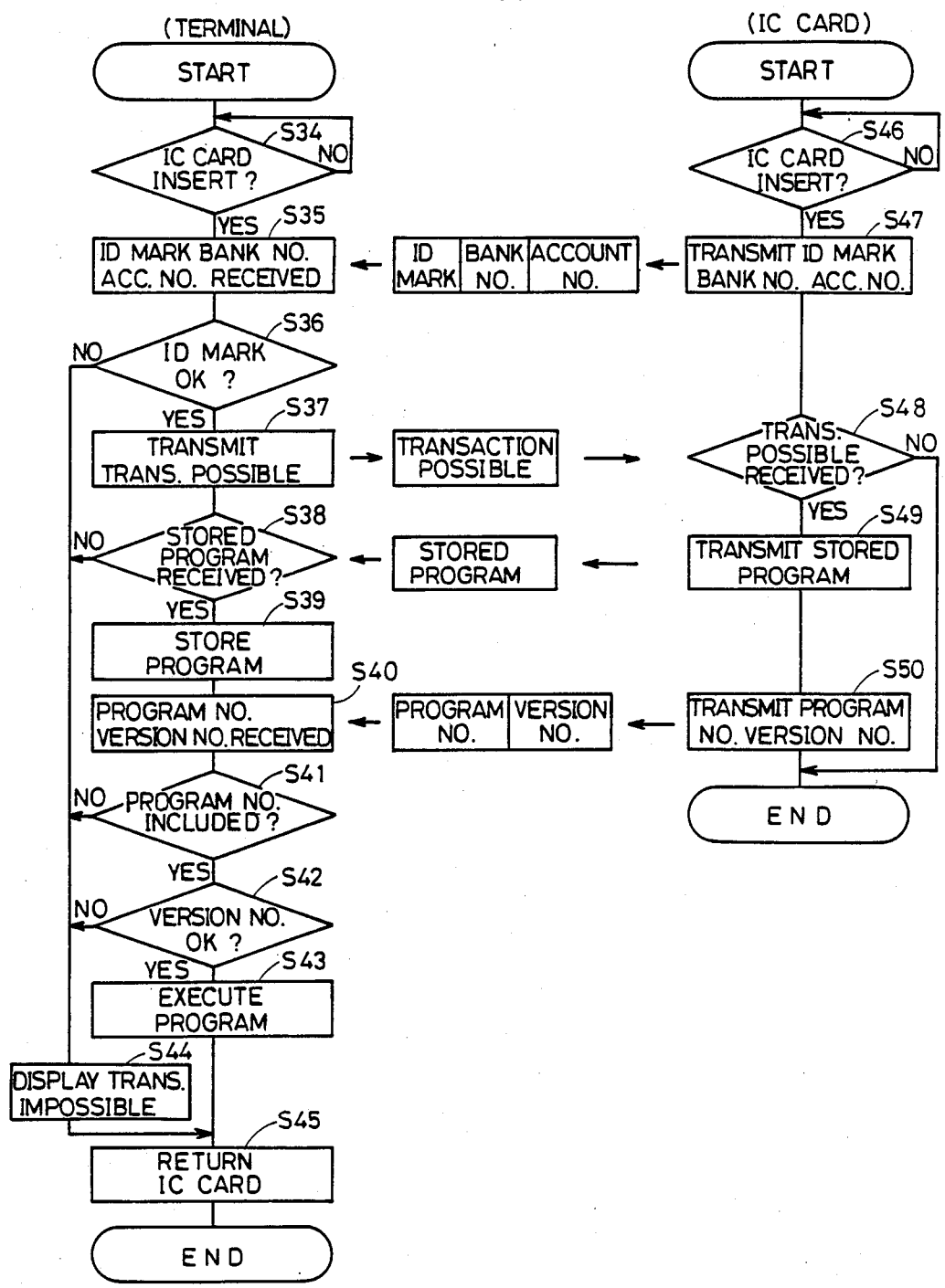
FIG. 11 is a flow diagram explaining an operation of an integrated circuit card system of another embodiment of the present invention.

FIG. 11 is a flow diagram explaining a specific operation of an integrated circuit card system of one embodiment of the present invention.

Referring to FIG. 11, a specific operation of one embodiment of the present invention will be described.

First, a customer directly goes to a bank where he wishes to make a transaction processing with an IC card as shown in FIG. 9. Then, the customer inserts his IC card into a terminal installed in the bank (Step S34, S46). Then, an electric power is supplied to all of the elements constituting the IC card shown in FIG. 1.

In the integrated circuit card, the CPU 1 reads out from the ROM 2 the data identifying a financial institution and the data specifying a transaction account, such as an ID mark, a bank number and an account number shown in the memory map of FIG. 9, and sends such data through the contact 5b to an IC card reader 9 of the terminal (Step S47).

On the other hand, in the terminal, the IC card reader 9 receives the data, such as the ID mark, the bank number and the account number, being transmitted from the IC card through the contact 5b (Step S35). The main control 8 determines whether the financial institution specifying data, such as ID mark, as received coincides with the identifying data inherent to the financial institution to which the terminal belongs (Step S36). As a result, if there is a inconsistency, the main control 8 makes the CRT 19 display to a customer that the card can not be used for a transaction (Step S44) and then the IC card is returned to the customer and the transaction is terminated (Step S45). If there is coincidence with respect to the identifying data, the main control 8 determines that the transaction requested by the customer is possible, so that a massage indicating that a transaction is possible is generated and sent to the IC card (Step S37).

In the IC card receiving such message, the CPU 1 determines whether the possible transaction indicating message is received or not (Step S48). If and when the possible transaction indicating message is not received, the transaction is terminated, and if and when a message indicating a possible transaction is received, the stored program for transaction processing procedures stored in the ROM 2, as shown in the memory map of FIG. 9 is read out and sent to the terminal (Step S49).

In the terminal, the main control 8 determines whether the stored program is received or not (Step S38). As a result, if and when the stored program is not received, the main control 8 makes the CRT 19 display a message to the effect that "this card can not be used for transaction processing" so that the customer can be informed that the transaction processing requested by him is impossible (Step S44) and the integrated circuit card is returned to a customer and the transaction is terminated (Step S45). If and when the stored program is received, the terminal temporarily stores the received stored program in the stored program buffer shown in FIG. 10 (Step S39).

In the integrated circuit card, the program number and the version number of the stored program, which are stored in the ROM 2, are read out and sent to the terminal (Step S50). The integrated circuit card completes its role by sending this message.

Then, in the terminal receiving this message, it is determined whether the number corresponding to the received program number is included in the program numbers stored in the storage areas of the terminal shown in FIG. 10 (Step S41). As a result, if there is no corresponding program number in the storage area, the main control 8 makes the CRT 19 display a message to the effect that "this card can not be used for transaction processing" so that the customer can be informed that the transaction requested by him is impossible (Step S44) and then, the IC card is returned to the customer and the transaction is terminated (Step S45). If and when there is a corresponding program number in the storage area, then the received version number is compared with the version number of the corresponding program stored in the storage areas shown in FIG. 10 (Step S42). As a result, if these version numbers do not coincide with each other, the main control 8 makes the CRT 19 display a message to the effect that this card can not be used for a transaction so that the customer can be informed that the transaction requested by the customer is impossible (Step S44) and then the IC card is returned to the customer and the transaction is terminated (Step S45). If and when these version numbers coincide with each other, the main control 8 determines that the transaction requested by the customer is possible to continue and subsequently, transaction processing such as payment, deposit and transfer can be executed in accordance with the stored program for transaction processing procedures which is stored in the stored program buffer (Step S43).

Furthermore, when execution of transaction processing is completed, the IC card is returned to a customer (Step S45), so that all of the transactions are terminated.

As described in the foregoing, in accordance with the present embodiment, a customer can easily perform a transaction of a predetermined content stored in the IC card if the terminal can be operated in accordance with his program stored in his IC card, and hence transaction efficiency can be improved. In addition, if the version number of his program does not coincide with that of the terminal, the terminal indicates to the customer that the transaction requested by him is impossible, so that a customer can know that his program has not been renewed yet, and therefore, the customer can try again to perform a transaction after renewing his program.

Figure 12:
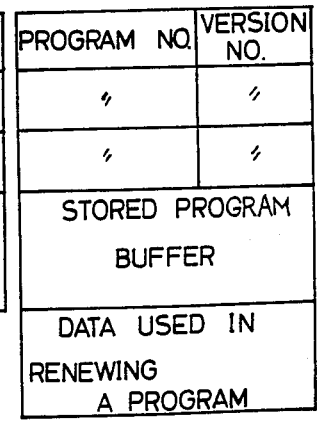
FIG. 12 is a memory map of a terminal for use with an integrated circuit card of another embodiment of the present invention.

FIG. 12 is a drawing showing a memory map of storage means provided in a terminal for use with an integrated circuit card which is another embodiment of the present invention. The memory map shown in FIG. 12 is the same as the memory map shown in FIG. 10, except for inclusion of a storage area for storing data used in renewing a program. The data used for renewing the program comprises various kinds of data, such as data for determining an effective time-period, for rewriting partially the program stored in the IC card when the version number of the program read out from the IC card does not coincide with the version number of the program of the terminal.

Figure 13:
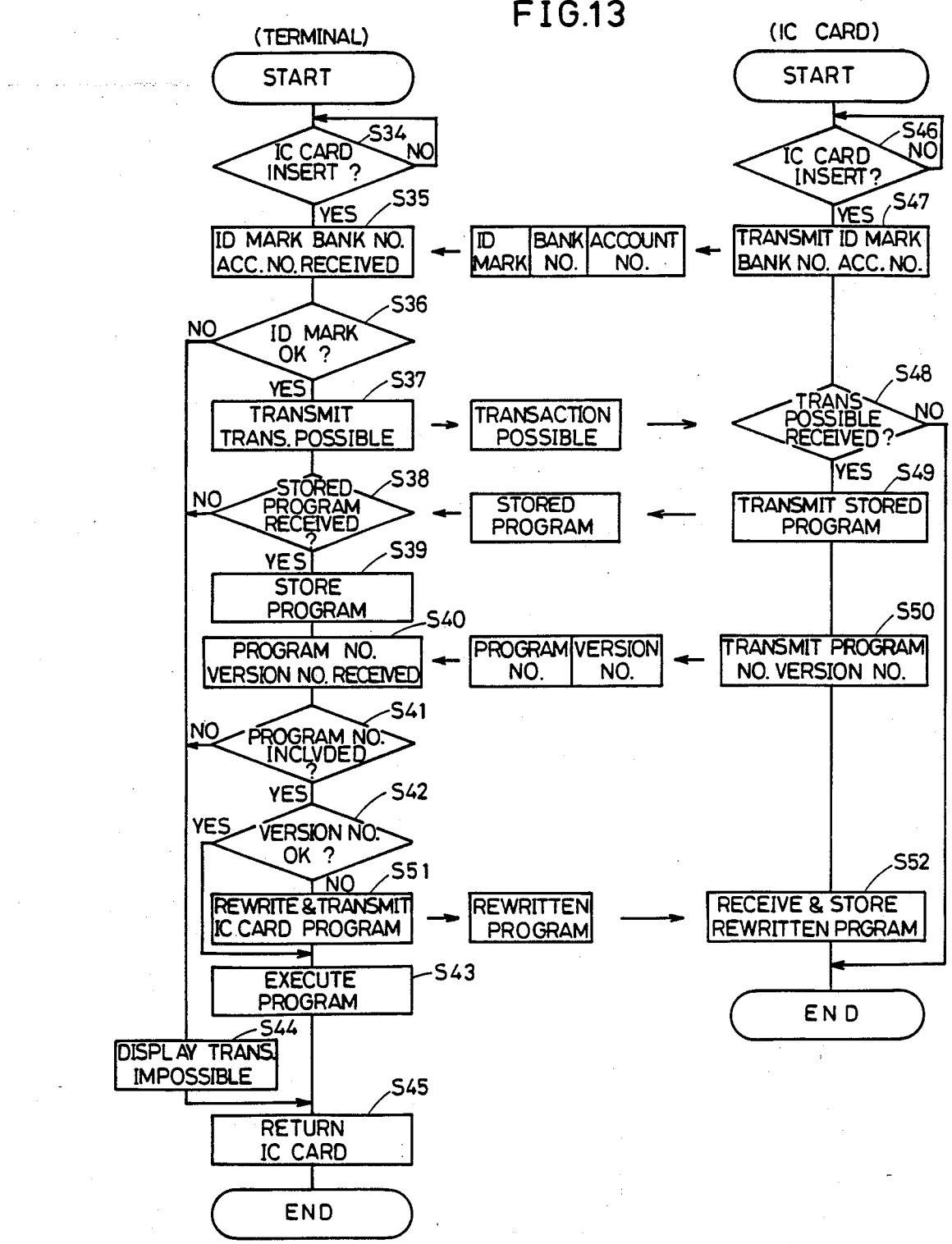
FIG. 13 is a flow diagram explaining an operation of a financial transaction processing system of another embodiment of the present invention.

FIG. 13 is a flow diagram explaining an specific operation of a financial transaction processing system which uses the terminal data arrangement shown in FIG. 12.

The embodiment shown in FIG. 13 is the same financial transaction processing system as that described with reference to FIG. 11, except for the following points. More particularly, additional step S51 for rewriting the program in the IC card and sending it to the IC card is interposed between the steps S42 and S43 and subsequent to the step S50, the step S52 is added in which the rewritten program is received and stored in the IC card.

More specifically, if there is no coincidence with respect to a version number in the step S42, the main control 8 rewrites the program of the IC card stored in the stored program buffer to the newest program which the terminal can execute, by using the data used for renewing the program shown in FIG. 12, and then, the rewritten program is sent to the IC card (Step S51). Then, the main control 8 can execute transaction processing such as a payment, deposit and transfer, in accordance with the rewritten program (Step S43).

In addition, in the integrated circuit card, the newest program as received from and rewritten by the terminal is stored in the storage area of the ROM 2 instead of the old program (Step S52).

If there is coincidence with respect to version number, the main control 8 determines that the transaction requested by the customer is possible to continue and subsequently, transaction processing can be executed in accordance with the program received from the IC card (Step S43).

As described in the foregoing, in accordance with the last mentioned embodiment, if and when the version number of the program stored in the IC card does not coincide with the version number of the program stored in the terminal, the terminal can execute transaction processing after rewriting the program stored in the IC card to the newest program, and hence, even if the IC card having a version number which has not been renewed yet is used, the card can be still used. Furthermore, if and when the card having the version number which has not been renewed yet, the program stored in the card is necessarily renewed to the newest program and hence the program in the IC card need not be renewed before transaction processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An integrated circuit card comprising:
    data storage means including a first storage area for storing data specifying a financial institution and a second storage area for storing at least one program for execution by a terminal with which said card is used, said program being for transaction processing procedures executable by said terminal; and
    means for reading out the storage contents stored in said data storage means.

2. A financial transaction processing system comprising:
    an integrated circuit card for use in financial transaction processing, said integrated circuit card including first data storage means having a first storage area for storing data specifying a financial institution and a second storage area for storing at least one program for execution by a terminal with which said card is used, said program being for transaction processing procedures executable by said terminal, and reading means for reading out the storage contents stored in said data storage means; and
    a terminal for communicating with said integrated circuit card, said terminal including means responsive to receipt of said financial institution specifying data read out from said first storage means for determining whether said financial institution specifying data coincides with the data specifying a financial institution to which said terminal belongs and for generating, upon coincidence, a signal indicating that a requested transaction is possible, said reading means of said integrated circuit card being responsive to said possible transaction indicating signal for reading out said program for transaction processing procedures from said second storage area and sending it to said terminal.

3. A financial transaction processing system in accordance with claim 2, wherein said terminal further includes impossible transaction indicating means for indicating that the transaction requested by a customer is impossible when no program for transaction processing procedures is stored in said second storage area of said integrated circuit card.

4. A financial transaction processing system in accordance with claim 2, wherein said second storage area stores a plurality of programs for transaction processing procedures, said terminal further includes program designating means for designating a desired program for a transaction processing procedure to be executed, from said plurality of programs, and said reading means of said integrated circuit card reads out the program designated by said program designating means from said plurality of programs stored in said second storage area and sends the program as read to said terminal.

5. A financial transaction processing system in accordance with claim 4, wherein each of said plurality of programs contains data specifying its own program, said program designating means includes data inputting means for inputting the data specifying a program to be executed, and said reading means of said integrated circuit card reads out the program containing the data coinciding with the data inputted by said data inputting means, from said plurality of programs stored in said second storage area.

6. A financial transaction processing system in accordance with claim 2, wherein said first data storage means further includes a third storage area for storing first data specifying said programs for transaction processing procedures, and a fourth storage area for storing second data indicating a version of said program and said terminal further includes second data storage means having a fifth storage area in which third data specifying at least one program for transaction processing procedures which is executable is stored and a sixth storage area in which fourth data indicating a version of said at least one program for executing transaction processing procedures, and program executing means for executing said program for transaction processing procedures read out by said reading means when said first data read out by said reading means coincides with said third data and said second data read out by said reading means coincides with said fourth data.

7. A financial transaction processing system in accordance with claim 6, wherein said second data storage means further includes a seventh storage area in which data used for renewing a program from a version indicated by said second data to a version indicated by said fourth data is stored, and said terminal further includes program rewriting means for rewriting said program for transaction processing procedures read out by said reading means to a program having a version indicated by said fourth data, using said data used for renewing program, when said first data read out by said reading means coincides with said third data and said second data read out by said reading means does not coincide with said fourth data, and said program executing means executes said rewritten program.

* * * * *